United States Patent [19]
Resnick

[11] Patent Number: 5,910,188
[45] Date of Patent: Jun. 8, 1999

[54] FLEXIBLE PROBE WITH SEPARATION ADJUSTMENT

[75] Inventor: Lawrence J. Resnick, Blue Bell, Pa.

[73] Assignee: Triumph Controls, Inc., North Wales, Pa.

[21] Appl. No.: 08/641,194

[22] Filed: Apr. 30, 1996

[51] Int. Cl.⁶ .................................................. G01F 23/28
[52] U.S. Cl. ..................................... 73/290 R; 73/866.5
[58] Field of Search ............................. 73/290 R, 304 R, 73/866.5

[56] References Cited

U.S. PATENT DOCUMENTS

| | | | |
|---|---|---|---|
| 3,398,578 | 8/1968 | Dozer ...................................... | 73/304 R |
| 3,703,829 | 11/1972 | Dougherty ............................ | 73/290 R |
| 4,166,388 | 9/1979 | Sun et al. ............................... | 73/304 R |
| 5,103,672 | 4/1992 | Terry, Jr. et al. ...................... | 73/304 C |
| 5,136,249 | 8/1992 | White et al. ............................ | 324/643 |
| 5,457,990 | 10/1995 | Oswald et al. ......................... | 73/290 V |
| 5,609,059 | 3/1997 | McEwan ................................ | 73/290 R |

OTHER PUBLICATIONS

Time Domain Reflectometry for Liquid Level Measurements by George D. Lehmkuhl, Down Chemical U.S.A., RFP–1902, Aug. 21, 1972.
Continuous Liquid Level Measurements with Time–Domain Reflectometry by J.E. Cruz et al., Advances in Cryogenic Engineering, 1973.

Primary Examiner—William A. Cuchlinski, Jr.
Assistant Examiner—Willie Morris Worth
Attorney, Agent, or Firm—Howard & Howard

[57] ABSTRACT

A probe (16) for use in measuring the level of fluid (12) in a tank (14) based on time-domain reflectometry detection utilizes a pair of flexible conductors (26, 28). The conductors (26, 28) may be removably placed in the tank (14) in a mounting bracket (32) secured to the tank (14), by sliding the conductors (26, 28) into the bracket (32), at one of a plurality of spacings. The selection of spacing of the conductors (26, 28) is based on the type of fluid utilized in the tank (14). The conductors (26, 28) are flexible to allow conformance to the contour of the tank (14).

8 Claims, 2 Drawing Sheets

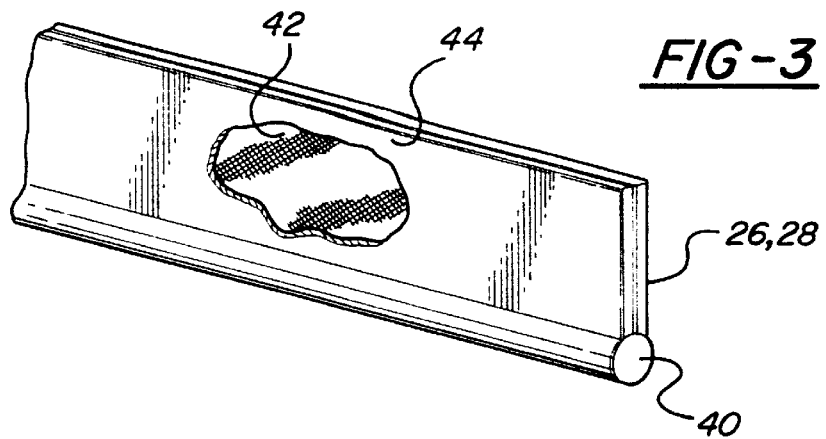
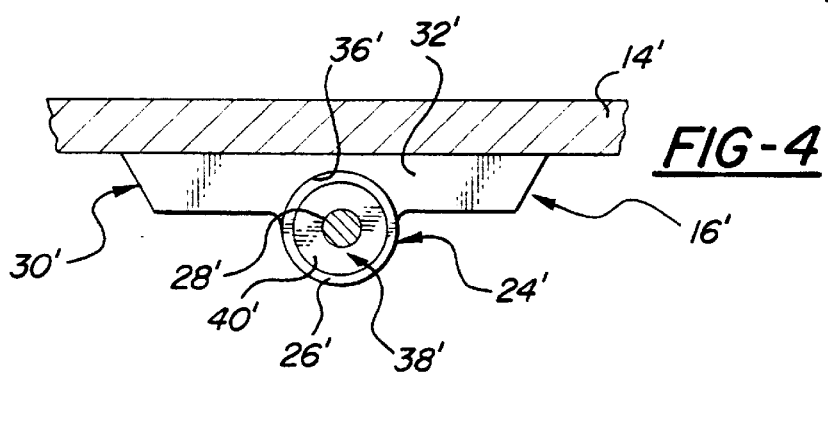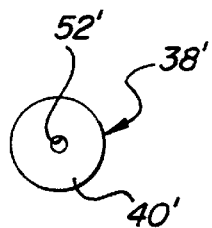
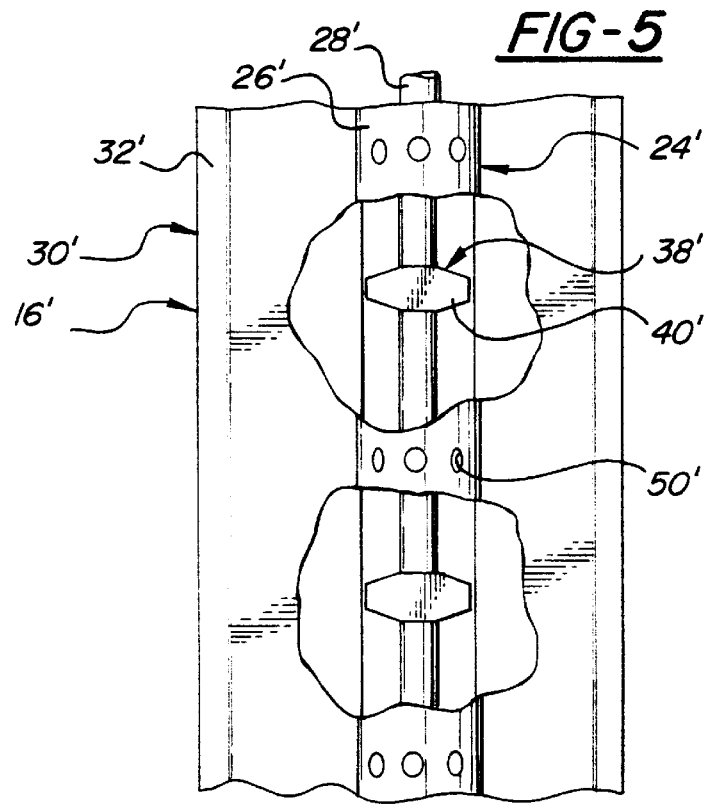

5,910,188

FLEXIBLE PROBE WITH SEPARATION ADJUSTMENT

TECHNICAL FIELD

The invention relates to measurement probes utilized in time domain reflectometry technology for measuring the level of substance in a tank.

BACKGROUND OF THE INVENTION

The technology of time domain reflectometry has been used in measuring liquid levels in a tank. Particularly where closed containers are utilized, time domain reflectometry (TDR) has allowed for remote liquid level measurement. TDR uses an electronic signal sent along a "transmission line" which is reflected at any change in dielectric constant or impedance interface, i.e., air and water. Time domain reflectometry is set forth in TIME DOMAIN REFLECTOMETRY FOR LIQUID LEVEL MEASUREMENTS by George D. Lehmkuhl, Dow Chemical U.S.A., RFP-1902, Aug. 21, 1972, and also in CONTINUOUS LIQUID LEVEL MEASUREMENTS WITH TIME-DOMAIN REFLECTOMETRY by J. E. Cruz et al, Advances in Cryogenic Engineering, 1973. In general, either a step function or pulse may be sent down the transmission line. When a change in impedance of the line is encountered by the transmitted signal, a reflection occurs. This reflection can be detected, and the time interval between the transmitted wave and the reflection can be used as a measure of the distance to the impedance change or interface. This time interval is used to measure the depth of liquid in a tank. Such coaxial probes have generally included an outer stainless steel tube and an inner stainless tube, both welded to a bottom plate, and having apertures included in the outer stainless steel tube to allow the fluid to flow therein.

U.S. Pat. No. 5,136,249, to White et al discloses probes for measuring level for use in TDR, and discloses the use of one, three and four probes of various spacing. However, this reference does not teach a sensor which has the ability to change the spacing of the probe within the same bracket or while connected in the tank.

U.S. Pat. No. 5,103,672, to Terry, Jr. et al discloses a flexible transmitter and fluid level engaging probe which includes spacers about the electrode within the tube to maintain proper spacing therein. However, this patent relates to a capacitive-type probe and not a true TDR probe.

The problems with the prior art probes are that generally tanks are of various contours and it is beneficial to utilize a flexible probe, and furthermore, various fluid or substance types may be utilized and the spacing of the coaxial sensor should be varied depending on the substance.

SUMMARY OF THE INVENTION

The invention is a measurement probe assembly for insertion in a tank to indicate the level of a substance in a tank. The assembly comprises a sensor means for detecting a change in impedance. The sensor means comprises a first conductor and a second conductor. The assembly also includes mounting means connecting the sensor means to a tank wall. The mounting means includes spacing means for fixedly connecting the second conductor at one of a plurality of predetermined distances from the first conductor within the tank.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a partially cut away view of the sensing fin of the first embodiment;

FIG. 4 is a top view of a second embodiment of the subject invention;

FIG. 5 is a partially cut away side view of the second embodiment of FIG. 4; and FIG. 6 is an end view of a smaller spacer.

DESCRIPTION OF THE PREFERRED EMBODIMENT

Figure 1:
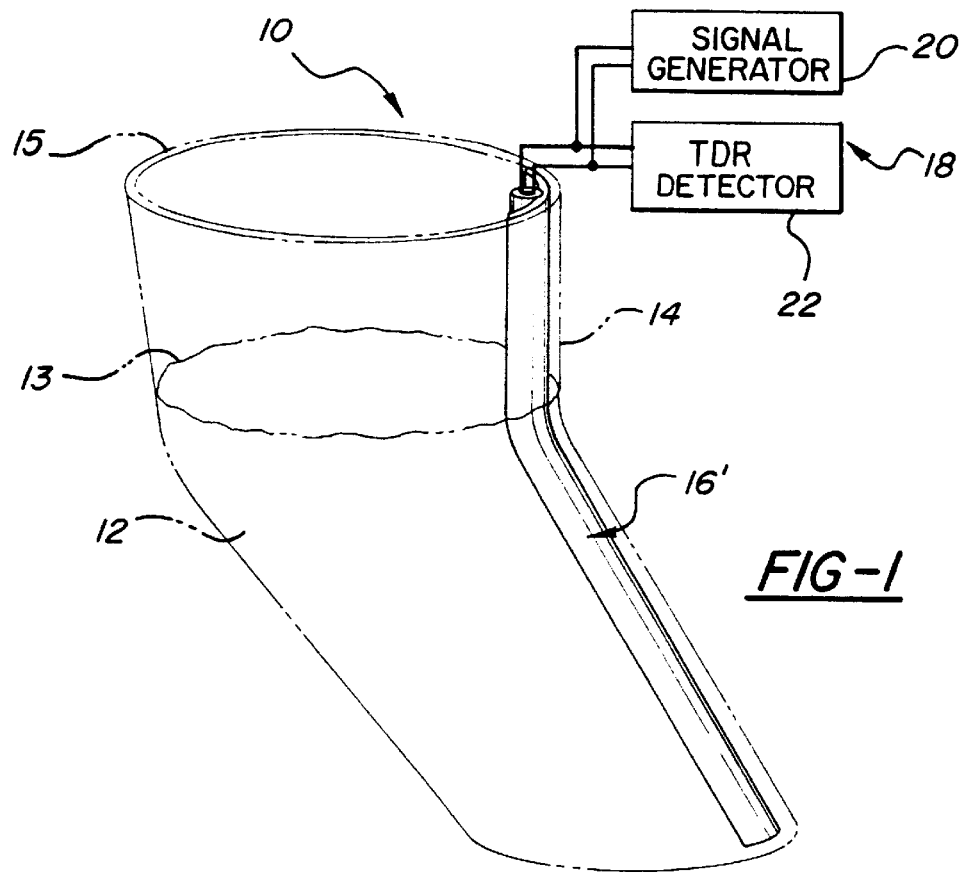
FIG. 1 is a schematic diagram of the time domain reflectometry system utilizing the second embodiment of the subject invention.

A measurement system 10 for measuring the level of a substance 12 in a tank 14 is generally illustrated in FIG. 1. The measurement system 10 commonly includes a measuring probe assembly 16 connected to control circuitry 18. The probe assembly 16 is of the type to measure a change in impedance or impedance mismatch of the surrounding substance 12 within the tank 14. Such change in impedance occurs at any interface 13 between two substances 12 or materials within the tank 14 which effects a change in dielectric constant within the probe assembly 16.

The control circuitry 18 transmits a pulsed signal to the probe assembly 16 and monitors any reflected signals therefrom. Reflected signals occur at the impedance mismatch interfaces 13. For example, an impedance mismatch interface 13 occurs at an air and fuel interface, fuel and water interface, etc. The control circuitry 18 monitors the time delay of the reflected signal from the transmitted signal which indicates the distance along the probe assembly 16 of the interface 13, from which level of the substance can then be determined.

The control circuitry 18 generally includes a signal generator 20 for generating the pulsed signal to the probe assembly 16. A detector circuit 22 receives the transmitted signal from the signal generator 20 and also monitors for reflected signals from the probe assembly 16. The detector circuit 22 measures the time between transmission and reflections of the pulsed signals to determine the distance to the interface 13 which translates into the level of the substance or substances 12 in a tank 14. The control circuitry 18 is based on time domain reflectometry (TDR) which technology is known in the art as discussed in the Background section. Time domain reflectometry is particularly useful in applications where two or more substances exist in a tank 14. For example, tanks 14 utilized in the shipping or naval industry may have interfaces 13 of air, water and oil. Each of the interfaces 13 may be measured by the control circuitry 18 sensing the original transmission along with two reflected signals.

The probe assembly 16 includes two different embodiments, wherein common teaching apply to both embodiments which will be initially discussed. The probe assembly 16 includes sensor means 24 for detecting a change in impedance. The sensor means 24 comprises a first conductor 26 and second conductor 28. The first and second conductors 26, 28 act as a transmission line to transmit a pulse of electromagnetic radiation along the conductors 26, 28. The substance 12 is allowed to flow between the conductors 26, 28 establishing the dielectric material for the transmitting signal. Change in impedance of the substance 12 between the conductors 26, 28 effects a change in dielectric which, in turn, causes a portion of the transmitted signal to be reflected as detected by the control circuitry 18. In general, the second conductor 28 is connected to the transmitted signal and the first conductor 26 acts as a ground plane. Both the substances 12 and spacing of the conductors 26, 28 effect the timing or frequency of the transmitted/reflected signal and detection by the TDR detector 22. It is desirable to provide uniform timing independent of the substance type 12 by changing the spacing, as subsequently discussed.

The probe assembly 16 includes mounting means 30 for connecting the sensor means 24 to a wall of the tank 14. The mounting means 30 includes connection means 32 fixedly connected to the tank 14 for first securing the first conductor 26 to the tank 14. The connection means 32 generally comprises a mounting bracket connected to the tank 14 which follows the contour thereof, and including a first track 36 for removably receiving the first conductor 26 in fixed connection therewith. The mounting means 30 and conductors 26, 28 extend for the depth or length of the tank 14 and are flexible to follow the contour of the tank 14. The bracket 32 may alternatively be formed to rigid material to conform to the shape of the tank 14.

The mounting means 30 also includes spacing means 38 for fixedly connecting the second conductor 28 at variable distances from the first conductor 26 within the tank 14. The spacing means 38 includes an extension member 40 secured to the first conductor 26 for fixing the first conductor 26 spaced from the second conductor 28 at one of a plurality of predetermined distances.

The variable spacing of the conductors 26, 28 is important due to the various types of fluids which may be in tank 14. In general, fuel tanks 14 have oil on the bottom and air at the top of the tank. With some naval applications, fuel tanks 14 include oil at the top and water at the bottom, which is used to force the oil into the fluid lines. The pulse travelling down the sensor means 24 is reflected at the oil/water or air/oil interface.

Due to the different densities between the air and the oil, it is desirable to change the spacing between the conductors 26, 28 of the sensor means 24 to allow the control circuitry 18 to operate properly and accurately. Closely spaced conductors 26, 28 would be used for air whereas further spaced conductors 26, 28 would be for water.

The teachings of the subject invention are not limited to the specific embodiments disclosed herein. The teachings of the spacing means 38 and connection means 32 may be implemented by different components. It is important that the mounting means 30 allow for a change in the spacing of the conductors 26, 28 while installed in a tank 14 for simplicity in use. This has further manufacturing and purchasing advantages by producing a single design of the mounting means 30 to be used in a plurality of different applications with different substances 12. In the preferred embodiment, two predetermined distances are provided for selection by the user during insertion of the conductors 26, 28 in the bracket 32.

The specific two embodiments illustrated in FIGS. 2–4 will be hereinafter discussed. Reference numerals utilized in the second embodiment include primed designation with the common numbers indicating similar parts thereof.

Figure 2:
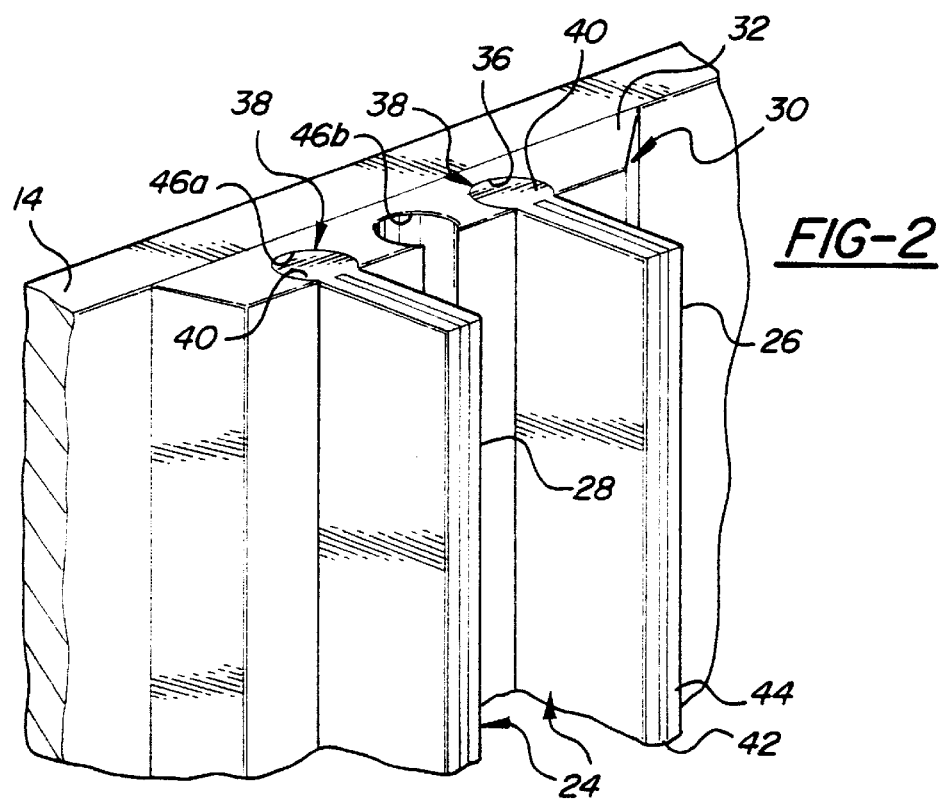
FIG. 2 is a perspective view of a first embodiment of the subject invention.

The first embodiment is illustrated in FIGS. 2–3. The first and second conductors 26, 28 are comprised of thin sensing elements or fins, generally a flat, flexible strip of wire braid 42 enclosed by an insulating layer 44. The conductors 26, 28 each include the extension member 40 comprising an enlarged rib extending the longitudinal length of the wire braid 42 at along an edge of the braid 42 for mounting in the mounting bracket 32. The mounting bracket 32 includes a plurality of circular slots 46 therein, and of the same type as the first track 36, which all extend parallel and longitudinally the length of the mounting bracket 32 along the depth of the tank 14, and are spaced from one another a predetermined distance. The circular slots 46 receive the rib or extension members 40 to secure the second conductors 28 to the bracket 32 at any of predetermined distances established by the spaced slots 46. For example, as illustrated in FIG. 2, two slots 46a, 46b are formed in the bracket 32 along with track 36. The first conductor 26 is securely placed in the first track 36. Thereafter, the second conductor 28 may be placed in either of the first or second slots 46a, 46b, depending on the substances 12 to be detected in the tank 14. The second conductor 28 would be placed in the closer slot 46b with respect to the first conductor 26 if an air/water combination was to be used in the tank 14, whereas the second conductor 28 would be placed in the furthest slot 46a from the first conductor 26 if oil/water is to be used in the tank 14. It is important that the single mounting bracket 32 can be installed and fixed in the tank 14 prior to the conductor placement. Thereafter, the first and second conductors 26, 28 may be placed in the bracket 32, depending on a substance 12 to be held in the tank 14, at the appropriate spacing. The conductors 26, 28 may be installed by sliding same in an appropriate slot 36, 46 from the top of the tank 14, at any time, and particularly after assembly.

The second embodiment is illustrated in FIGS. 4–5. In this embodiment, a coaxial sensor means 24' is utilized. The coaxial sensor means 24' includes the second conductor 28', as a wire conductor or flexible tubular conductor, which is coaxially located in the surrounding first conductor 26', generally comprised of a flexible tube. The mounting bracket 32' includes an enlarged semi-circular slot 36' therein for receiving the first conductor 26 in fixed connection therewith. The first conductor 26' may be slid into the slot 36' from the top of the tank 14, or may be fixedly connected to the bracket 32'. The first conductor 26' includes a plurality of opening 50' therein to allow the substance 12 or fluid flow therethrough. The second conductor 28' is connected to the spacing means 38', and more specifically, the extension member 40' and coaxially within the first conductor 26'. The extension member 40' generally comprises a plurality of disk-type members having a diameter equal to the inside diameter of the first conductor 26' for centrally locating the second conductor 28' within the first conductor tube 26'. The extension member 40' includes an aperture 52' through the center thereof to receive the second conductor 28'. In order to achieve the various spacing, various diameters of the second conductor 28' may be utilized in the first conductor 26', along with various spacing means 38' having different aperture 52' sizes therethrough to receive the different sized second conductors 28'. For example, a large diameter wire 28' will have spacing closer to the first conductor 26' as compared to a smaller diameter wire 28'. The spacing means 38' may be comprised of any shaped member which centrally locates the wire 28' within the tube 26'. Several spacers 38' are longitudinally spaced along the wire 28' to maintain the central spacing for the length of the probe assembly 16. FIG. 6 illustrates a smaller diameter second conductor 28' with smaller spacer aperture 52', and a larger one, respectively. In the preferred embodiment, two sized spacers 38' and conductors 28' are available for selection.

In both embodiments of the probe assembly 16, 16', the conductors 26, 28, 26', 28' are of such flexibility to allow the conductors to bend in mating contour with the tank 14. However, the conductors 26, 28, 26', 28' are of a sufficient rigidity to maintain the shape thereof during the bending to the contour of the tank 14 when the conductors 26, 28, 26', 28' may comprise a bendable copper material, or any other suitable conductive material. The bracket 32 and spacing means 38 preferably comprises a non-conductive material. The bracket 32 may be flexible to conform to the shape of the tank 14, or may be rigid and premolded to the shape of the tank 14.

In either embodiment of the probe assembly 16, the bracket 32, may be pre-installed in the tank 14. However, the conductors 26, 28 may be removably installed at any time from the top 15 of the tank, and spacing changed at any time.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A measurement probe assembly (16) for insertion into a tank (14) to indicate the level of a substance (12) in the tank (14), said assembly comprising:

sensor means (24) for detecting a change in impedance in the substance (12);

said sensor means (24) comprising a first conductor (26) and a second conductor (28);

mounting means (30) connecting said sensor means (24) to a tank wall;

said mounting means (30) including connection means (32) for fixedly securing said first conductor (26) to the tank wall (14); and said assembly characterized by said mounting means (30) including spacing means (38) for fixedly connecting said second conductor (28) at one of a plurality of predetermined distances from said first conductor (26) within the tank (14).

2. An assembly as set forth in claim 1 further characterized by said first conductor (26) and said second conductor (28) being comprised of a flexible material to allow bending thereof to conform to the contour of the tank (14).

3. An assembly as set forth in claim 2 further characterized by said spacing means (38) including an extension member (40) secured to said second conductor (28) for fixing said second conductor (40) at one of said plurality of predetermined distances from said first conductor (26).

4. An assembly as set forth in claim 3 further characterized by said connection means (32) comprising a mounting bracket adapted to be fixedly connected to the tank (14) and including a first track (36) for removably receiving said first conductor (26) in fixed connection therewith.

5. An assembly as set forth in claim 4 further characterized by said extension member (40) comprising a rib extending along each of said conductors (26, 28).

6. An assembly as set forth in claim 4 further characterized by said mounting bracket (32) including a plurality of additional tracks (46) for receiving said second conductor (28) at one of said predetermined distances from said first conductor (26).

7. An assembly as set forth in claim 4 further characterized by said extension member (40') comprising a plurality of selectable coaxial spacers (38') connected about said second conductor (28') and having an aperture (52') therethrough, said first conductor comprising a tubular member coaxially inserted within said first conductor (26') and centrally spaced therein by said coaxially spacer, said first conductor being of variable diameter.

8. A method of using a measurement probe assembly in a tank to measure the level of various substances, the method including the step of:

placing and connecting a mounting bracket (32) in a tank (14), securing a first conductor (26) to the mounting bracket, securing a second conductor (28) spaced from said first conductor (26) at one of a plurality of predetermined distances from said first conductor (26) in said mounting bracket (32).

* * * * *